United States Patent Office 3,043,202
Patented July 10, 1962

3,043,202
PHOTOGRAPHIC CAMERA
Erich Hahn, Dresden, Germany, assignor to VEB Kamera- und Kinowerke Dresden, Dresden, Germany
Filed June 20, 1960, Ser. No. 37,259
1 Claim. (Cl. 95—10)

The present invention relates to a photographic camera with fully automatic control of an exposure factor, preferably the diaphragm, wherein a spring-driven setting member explores the position of a meter pointer.

Known control devices of this nature are so designed that the setting member is pressed under spring action against the meter pointer. It is disadvantageous that these control devices possess no handle which permits the manual adjustment of this exposure factor after switching off of the fully automatic system.

It is the task of the present invention to avoid this disadvantage and to provide a simple and reliably working manual adjustment possibility for the automatically controlled setting member.

In accordance with the invention this is achieved due to the fact that a setting handle is provided which actuates a switch situated in the measuring current circuit and possesses a control dog which lies in the path of the meter stop. The details of the invention may be seen from an example of embodiment describing and representing a fully automatic diaphragm control.

Figure 1:
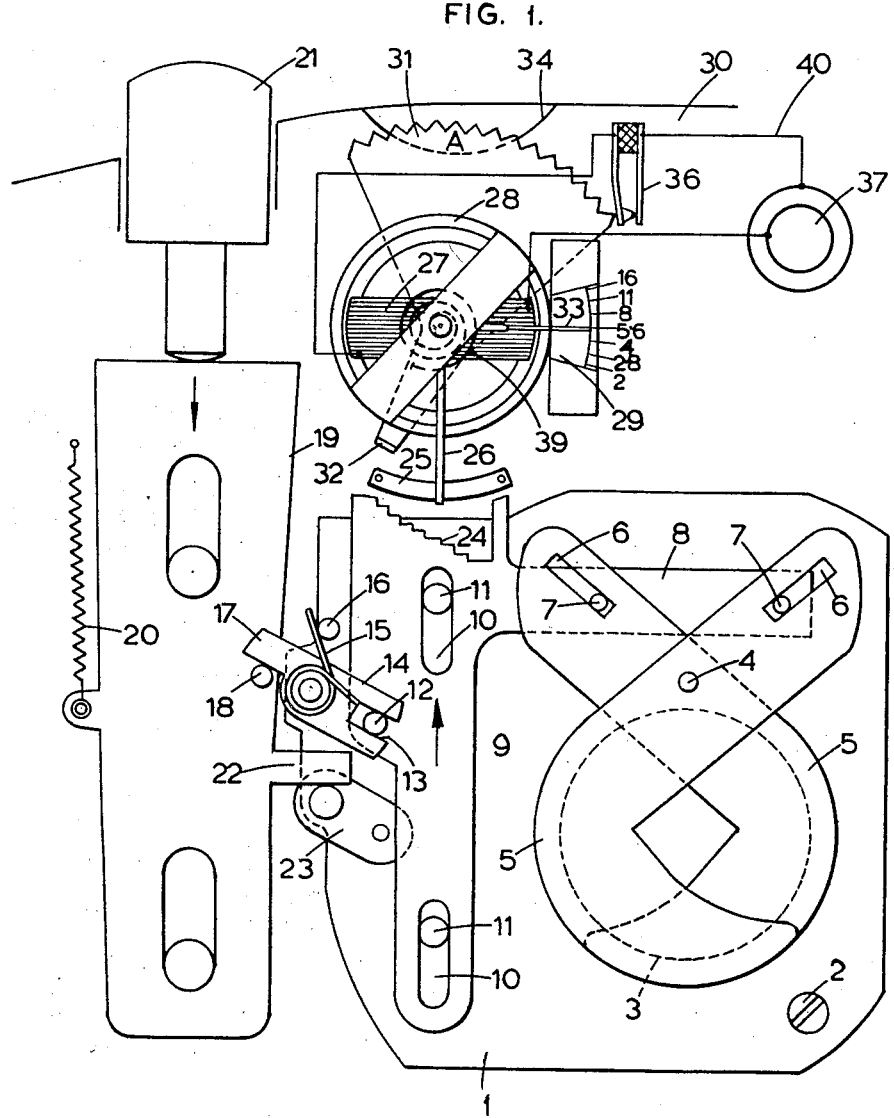
Figure 2:
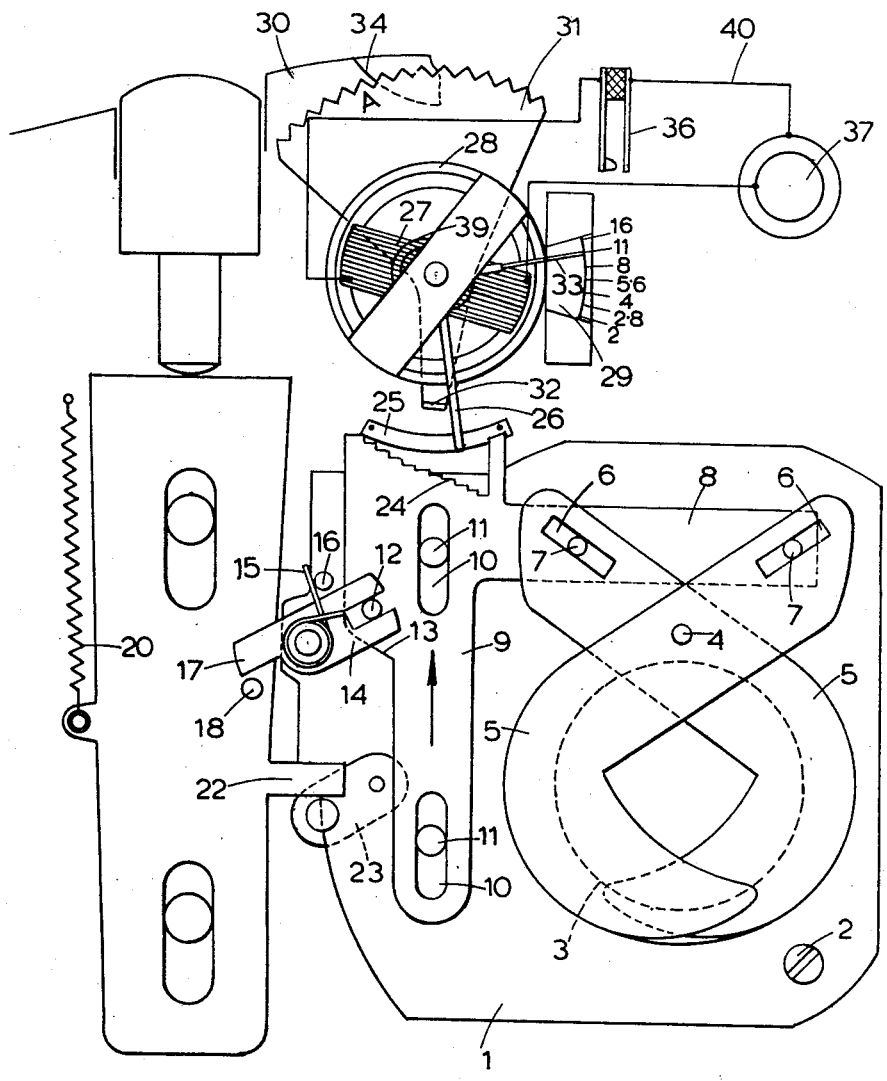

FIGURE 1 shows the control device in the cocked position with fully automatic system switched on and FIGURE 2 shows the control device during the taking of a picture, the diaphragm value having been set manually.

In the camera housing 30, only partially illustrated, there is secured by means of screws 2 the shutter base plate 1. Over the light passage aperture 3 there lie the diaphragm blades 5 rotatable about the pivot pin 4, in the slots 6 or which blades there engage pin 7. The said pins 7 are secured on the arm 8 of the setting member 9, which is guided by means of slots 10 in pins 11 mounted on the base plate 1. The pin 12 of the setting member 9 lies in a fork 13 of the transmission lever 14, which is supported through the spring 15 on the pin 16 fast with the housing. Through the arm 17 the transmission lever 14 is connected with the pin 18 of the camera release 19, on which the return spring 20 is secured. The return spring 20 is made stronger than the drive spring 15. For the displacement of the camera release 19 there serves the release knob 21. The lug 22 off from the camera release 19 is in engagement with the shutter release 23.

Into the setting member 9 there is machined a cam 24. Opposite this cam the meter stop 26 swings along a support bar 25, and is connected with the moving coil 27 of a meter 28. The meter pointer 33 is visible in a window 29 provided with diaphragm values. Concentrically with the meter 28 there is rotatably mounted the setting handle 31, which possesses a control dog 32. This control dog 32 is moved, on rotation of the setting handle 31, in the path of the meter stop 26. Through a recess 34 in the camera housing 30 the grooving 35 of the setting handle 31 is accessible. In the path of the setting handle 31 there lies the switch 36, which is arranged in the lead 40, which connects the photo-electric cell 37 with the moving coil 27 of the meter 28.

The manner of operation of the device is as follows:

If it is desired to work with automatic control of the diaphragm, the setting handle should be set to "A." In this case the switch 36 remains closed and the control dog 32 remains without influence upon the meter stop 26. If then on aiming at an object to be photographed the meter pointer 33 is visible in the free range of the window 29 provided with a diaphragm scale, an exposure can be effected. If the meter pointer 33 is not visible, the diaphragm range available is not sufficient for the execution of a properly exposed picture-taking. For the purpose of release of the shutter the release knob 21 is pressed down. Consequently the camera release 19 is shifted against the action of the return spring 20. Then the pin 18 leaves the arm 17 of the transmission lever 14, so that the drive spring 15 can rotate the said transmission lever 14 in the counter-clockwise direction. The fork 13 of the transmission lever 14, through the pin 12, presses the setting member 9 with its cam 24 against the meter stop 26 resting on the support bar 25. According to the position of the meter stop 26 the setting member 9 is shifted more or less far, so that through the pins 7 arranged on the arm 8 the diaphragm blades 5 more or less clear the light passage aperture 3. Finally the lug 22 rotates the shutter release 23, whereby the exposure operation is instigated.

If for example in the case of flash exposures the diaphragm is to be set manually, the setting handle 31 is rotated in the counter-clockwise direction. Then firstly the switch 36 opens, so that current no longer flows through the moving coil 27 and under the action of its return spring 39 the coil returns into the rest position. Then the meter stop 26 connected with the moving coil 27 strikes upon the control dog 32 of the setting handle 31, which through the meter stop 26 rotates the moving coil 27 and the meter pointer 33 against the action of the return spring 39. In the window 29 the diaphragm value set by the setting handle 31 can be read off.

On depression of the release knob 21 the running off of the control device is instigated, which proceeds as in the case of the fully automatic control.

I claim:

In a photographic camera having a housing, a shutter device including an aperture diaphragm mounted on the housing, a shutter operating mechanism, an electric circuit including a photo-electric moving-coil exposure meter, a coil return spring connected to the moving-coil, and an indicating pointer attached to the moving-coil, which pointer moves over a scale provided on the housing; the provision of a meter stop connected to the moving-coil, exposure factor setting means operatively connected to the aperture diaphragm and slidably mounted in the housing so as to be substantially rectilinearly movable towards the meter stop, which means is provided with a stepped cam to abut against the meter stop when the setting means is moved towards said meter stop, the setting means position when abutting against the meter stop depending upon the position of the latter, a drive spring connected between the housing and the setting means for urging the latter towards the meter stop, a camera release member operably connected to the shutter operating mechanism, a return spring connected to the camera release member to oppose operation of the release member, a transmission member coupled between the camera release member and the setting means in such a manner that the return spring is able to overcome the drive spring and to urge the setting means away from the meter stop when the camera release member is unoperated, while allowing the setting means to move towards the meter stop, under the action of the drive spring, upon operation of the camera release member, a switch in said electric circuit, and a manually movable setting member having a range of movement over which the setting member engages the meter stop to move the latter against the coil return spring to any selected position and a position at which the setting member closes the switch and becomes disengaged from the meter stop when automatic aperture diaphragm setting is required.

References Cited in the file of this patent

UNITED STATES PATENTS

| | | |
|---|---|---|
| 2,058,531 | Tuttle | Oct. 27, 1936 |
| 2,061,909 | Karg | Nov. 24, 1936 |
| 2,841,064 | Bagby | July 1, 1958 |